United States Patent

[11] 3,624,767

[72] Inventor Edward R. Kroeger
Beloit, Wis.
[21] Appl. No. 61,193
[22] Filed Aug. 5, 1970
[45] Patented Nov. 30, 1971
[73] Assignee Warner Electric Brake & Clutch Company
Beloit, Wis.

[54] SELF-ADJUSTING CLUTCH OR BRAKE
14 Claims, 13 Drawing Figs.
[52] U.S. Cl. ................................................ 192/18 B,
188/71.8, 188/196 P, 192/84 A, 192/111 A
[51] Int. Cl. ..........................................F16d 13/75,
F16d 65/52
[50] Field of Search............................ 192/18 B,
84 A, 111 A; 188/71.8, 196 P

[56] References Cited
UNITED STATES PATENTS
2,705,058  3/1955  Harter ......................... 188/196 P X
3,086,634  4/1963  Reed ............................ 192/111 A
3,255,846  6/1966  Livezey ........................ 192/111 A X
3,421,604  1/1969  Hobbs .......................... 192/111 A X
3,485,330  12/1969 Reiff ............................ 192/111 A X
FOREIGN PATENTS
966,888  8/1964  Great Britain ................ 192/111 A Primary Examiner—Allan D. Herrmann
Attorney—Wolfe, Hubbard, Leydig, Voit & Osann ABSTRACT: The armature ring of a magnetic friction brake or clutch is supported on a rotary hub through the medium of a plurality of angularly spaced leaf springs extending along secants of the armature, riveted at opposite ends to the armature and hub, and stressed to bias the armature axially away from its coating magnet face. Pins rigid with the armature project loosely into holes in the hub and carry split resilient rings which constitute frictionally held stops movable between axially spaced abutments on the hub, one abutment acting when the brake is energized to shift the ring along the pin a distance corresponding to the wearing off of the armature face in previous brake applications. The other abutment coacts with the stop ring to determine the extent of separation of the armature from its magnet when the latter is deactivated and thus determine the width of the idle air gap between the rings.

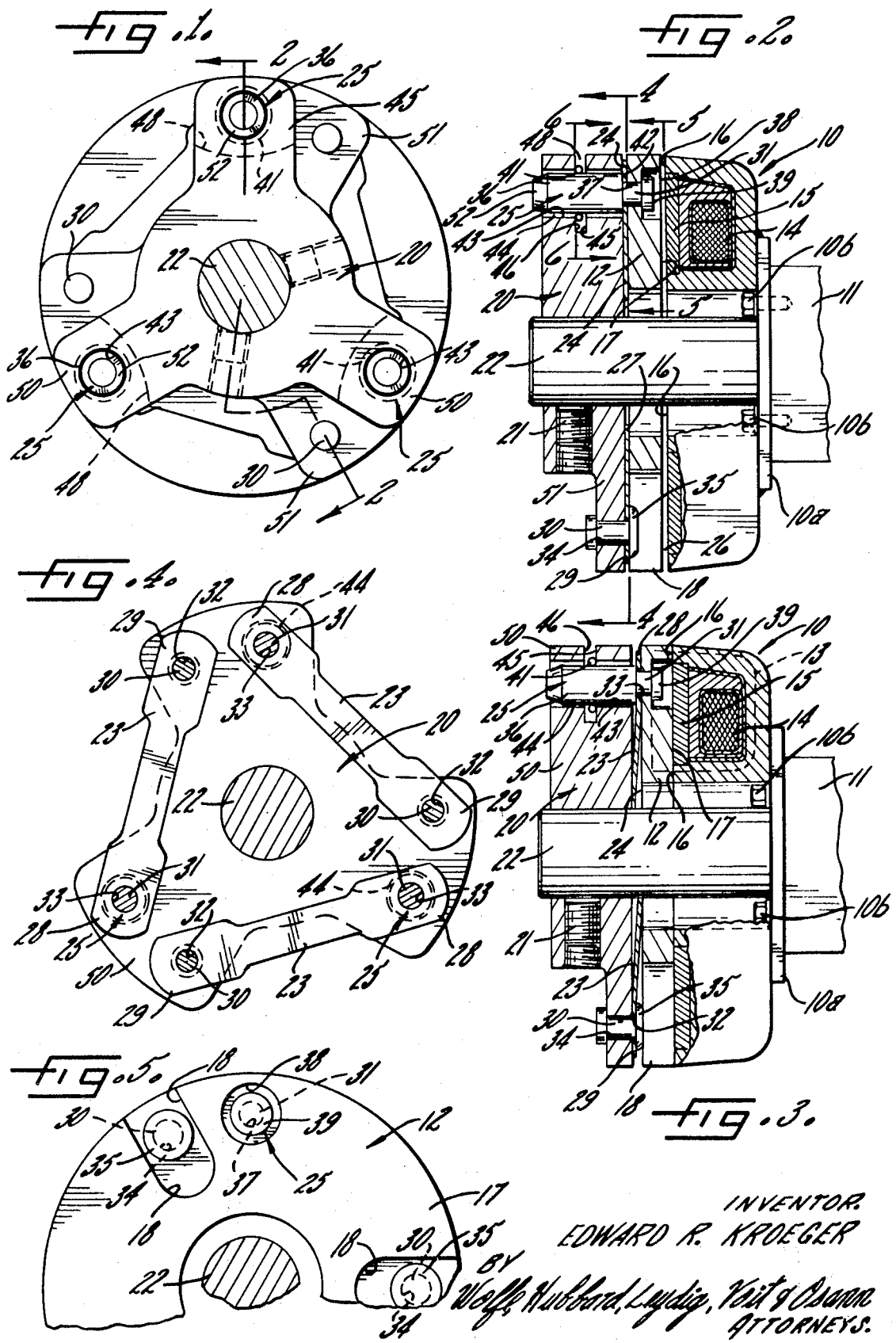

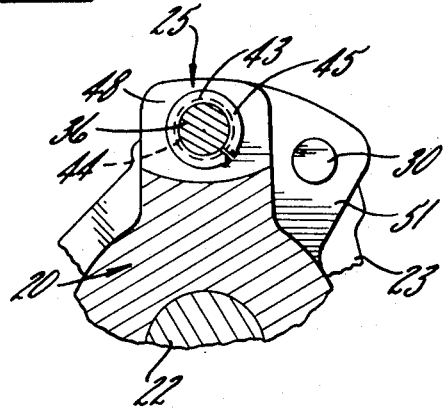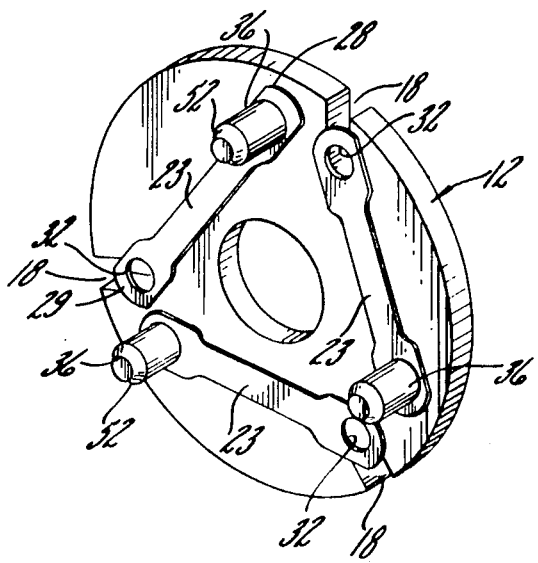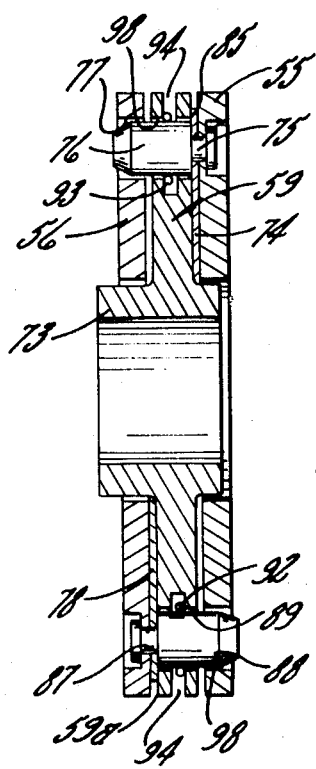

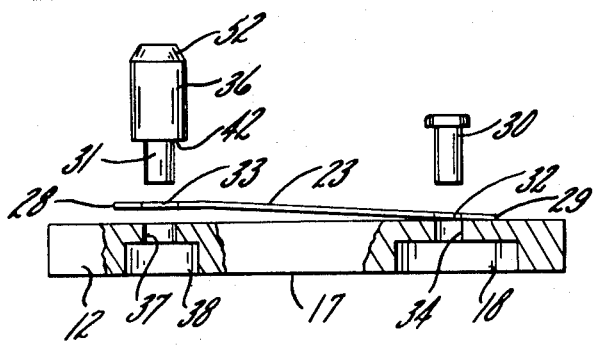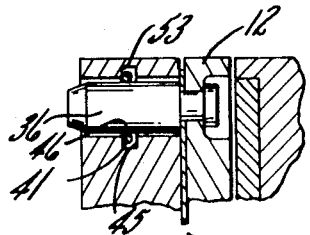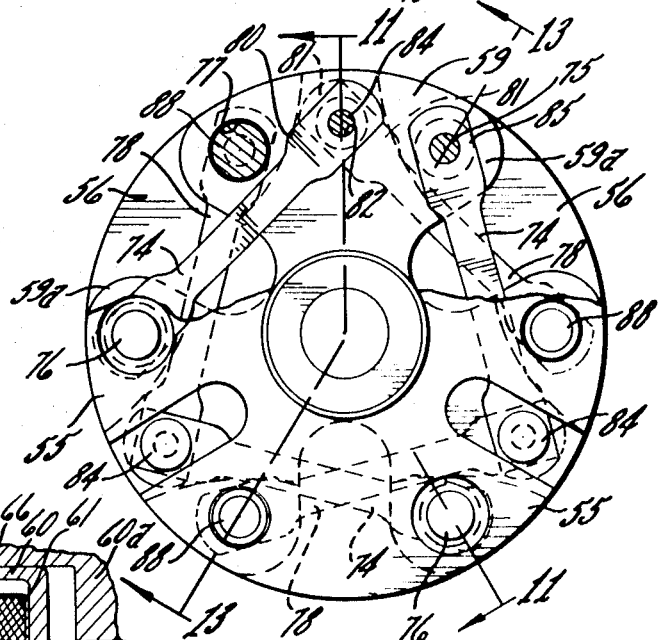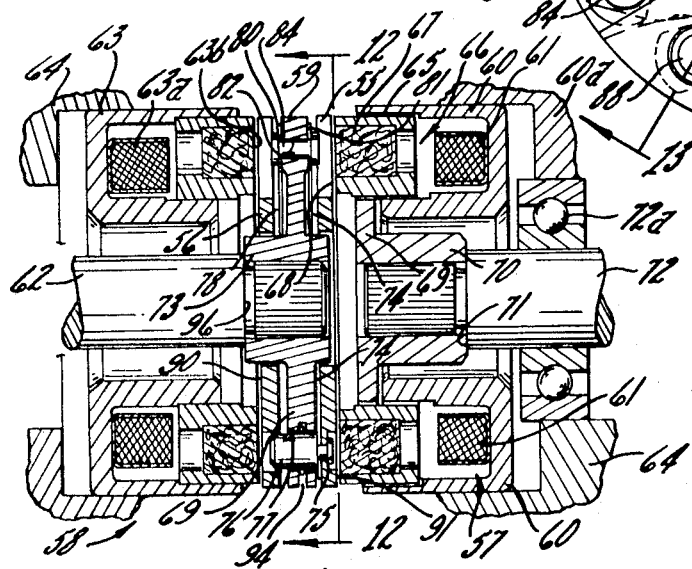

//
3,624,767

SELF-ADJUSTING CLUTCH OR BRAKE

BACKGROUND OF THE INVENTION

This invention relates to magnetic friction clutches and brakes in which relatively rotatable rings of magnetic material are drawn into axial gripping engagement by flux threading a toroidal flux path defined by the rings and has more particular reference to such torque-producing couplings which are equipped with one or more devices for sensing wear at the friction faces and operating, as an incident to successive attractions and releases of the coupling rings, to automatically adjust the axial position of one of the rings and maintain an air gap of narrow and approximately constant width after each deenergization of the coupling.

In such wear-adjusting devices as disclosed, for example, in U.S. Pat. No. 2,705,058, a frictionally supported stop carried by the axially movable magnetic ring moves against one abutment when the coupling is energized and slips relative to the ring by an amount determined by the existing amount of wear. When the coupling is deenergized, the ring and stop are biased away from the coacting ring and against a second abutment which limits the separation and determines the width of the resulting gap between the ring faces of the idle coupling.

In prior devices of this character, the pin supporting the friction stops transmits the coupling torque thus imposing on the pin a friction load which makes it difficult to maintain an idle gap as small as desired or to insure uniformity of the gap width. In addition, the magnet ring and the adjusting devices are usually supported through a spline coupling which inherently incorporates angular backlash that cannot be tolerated in many modern motion-control installations.

SUMMARY OF THE INVENTION

The primary aim of the present invention is to eliminate backlash in magnetic couplings of the above character while avoiding the transmission of the coupling torque through the parts of the automatic gap-adjusting devices. This is accomplished by supporting the axially movable magnetic ring for free axial floating through the medium of a plurality of angularly spaced leaf springs which extend generally tangentially of the ring and are stressed endwise to transmit the coupling torque without imposing any torque or friction load on the parts of the gap-adjusting devices.

Another object is to mount the stop controlling pins of the gap-adjusting devices for free endwise movement with the magnetic ring so that by lateral prestressing of the leaf springs, the latter are utilized to provide the necessary ring separating force and to coact with the friction stops to maintain between the coupling rings an idle air gap which is precisely uniform and substantially narrower, for example, only a few thousandths of an inch, than has been possible with the similar wear-adjusting devices of the prior art.

The invention also resides in the novel mounting of the gap controlling pins and the construction of the stop limiting abutments.

Another object is to provide a novel hub construction for enabling both armatures of a clutch-brake coupling to be mounted thereon through the medium of pairs of leaf springs of the above character while providing optimum axial compactness of the assembly.

BRIEF DESCRIPTION OF THE DRAWINGS

FIG. 1 is an end view of a magnetic ring and its supporting hub of a friction coupling embodying the novel features of the present invention.

FIG. 2 is a section taken along the line 2—2 of FIG 1 with the coupling deenergized.

FIG. 3 is a similar section with the coupling engaged.

FIGS. 4, 5 and 6 are sections taken along the lines 4—4, 5—5 and 6—6 of FIG. 2.

FIG. 7 is a perspective view showing a subassembly of the magnet ring and its supporting leaf springs.

FIG. 8 is an exploded cross-sectional view of the magnetic ring and the associated parts for supporting the same.

FIGS. 9 and 10 are fragmentary views similar to FIG. 2, showing modifications in the mounting of the gap controlling stop.

FIG. 11 is a fragmentary section similar to FIG. 2 of a combined clutch and brake incorporating the present invention, the section being taken along the line 11—11 of FIG. 12.

FIG. 12 is a section taken along the line 12—12 of FIG. 11.

FIG. 13 is a section taken along the line 13—13 of FIG. 12.

DESCRIPTION OF THE PREFERRED EMBODIMENTS

For the sake of simplicity, the invention is shown in FIGS. 1 to 8 of the drawings incorporated in an electromagnetic friction brake comprising an annular ring 10 of magnetic iron fixed as by welds to a plate 10a which in turn is secured as by screws 10b to a stationary support 11 and a rotatably mounted armature or driving ring 12 forming with the magnet ring a toroidal flux circuit 13 and adapted to be drawn into axial gripping engagement with the face of the magnet ring upon energization of a multiple turn coil 14 disposed between the concentric pole pieces of the magnet. The magnet ring is of U-shaped cross section and its pole pieces are spanned radially by an annulus 15 of wear-resistant material whose axial facing surface is flush with the pole faces 16 of the magnet ring. The opposed face 17 of the armature ring is substantially flat and overlaps the inner and outer pole faces of the magnet ring to complete the flux circuit. As is customary, outwardly opening slots 18 are formed in and extend radially across the major width of the armature face 17 to receive particles wearing off from the engaging faces in service use and throw such particles out of the way. The armature is mounted on a disklike hub 20 which is secured as by set screws 21 on a shaft 22 whose motion is to be controlled by the brake. The shaft is journaled and axially fixed in the support 11 and projects axially through the magnet and armature rings and into the hub.

As set forth above, the invention contemplates transmission of the braking torque to the hub and supporting the armature ring for free axial floating through the use of a plurality of angularly spaced and generally tangentially extending leaf springs 23 which are prestressed laterally to provide the force needed for separating the armature from the magnet face when the brake is deenergized and enable an equal number of wear-sensing devices 25 to act in limiting the armature separation so as to establish an idle gap 26 when the magnet is deenergized and the brake released. By virtue of the present invention, the gap may be extremely narrow, for example 0.003 to 0.007 of an inch, and will always be of precisely the same width after each release of the brake.

Three substantially flat and straight leafs of ordinary spring steel are preferably employed and disposed between the flat back 24 of the armature ring and the opposed inner end face 27 of the hub. Herein, the ends 28 of the three springs are equally spaced around and secured flat against the back of the armature and extend from these points around the armature in the same direction and along secants of the armature as best shown in FIGS. 4 and 7. The opposite ends 29 are similarly secured to the face 27 of the hub. While the spring ends may be attached in other ways, deforming the leafs or straining the metal thereof is avoided by employing rivets 30 and 31 extending through holes 32 and 33 in the spring ends 29 and 28 respectively. The shank of each rivet 30 extends through a hole 34 in the hub with its peened over head 35 exposed through one of the armature slots 18 which is wide enough to accommodate the riveting tool.

An important feature of the invention is the formation of the rivets 31 from shanks comprising necked down end portions of cylindrical pins 36 which constitute parts of the three wear-adjusting devices 25 above referred to. Each pin shank is projected through the hole 33 (FIG. 8) in a spring end 28 and an aligned hole 37 in the armature. Through a depression 38 in the armature face 17, the end of the shank 31 is accessible for peening over of the metal to form the rivet head 39 with the spring end clamped rigidly against a shoulder 42 at the inner end of the pin shank.

It will be apparent that the armature is supported from the rotating hub 20 solely by the leaf springs 23 which, by lateral flexing along the coupling axis, provide for free axial floating of the ring toward and away from the magnet face. For the same reason, all of the retarding torque is transmitted endwise through the leaf springs which are placed under tension when the brake is applied with the shaft 22 rotating in one direction and under compression in the other direction of rotation. All looseness or angular backlash in the coupling is thus eliminated. Of course, the springs are flexible enough to provide the desired free axial floating of the armature and, according to the size and capacity of the coupling, are made wide and thick enough to avoid buckling intermediate their riveted ends 28 and 29 when the direction of the transmitted torque is such as to place the springs under endwise compression. The spring ends 28 and 29 are relatively large in area and clamped against the flat surfaces 24 and 27 on the armature back and the hub so that the danger of buckling of the springs is effectually minimized.

In the present instance, the leaf springs, in addition to supporting the armature ring without backlash, are utilized, as will appear presently, to perform a new function in combination with the wear-adjusting devices 25, that function being to force the armature ring away from the magnet when the latter is deenergized to release the brake or clutch as the case may be. For this purpose, the springs are bent initially as shown in FIG. 8 or in the course of the final assembly of the coupling parts so that each spring is prestressed in a direction to provide an axially directed force of proper magnitude continuously biasing the armature away from the magnet and thus forcing separation of the two when the magnet is deenergized.

The wear-adjusting devices 25 above referred to for maintaining a precisely constant and narrow width of the idle gap 26 correspond in number to the leaf springs 23 and are advantageously located at the spring ends 28 because the rivets 31 for fixing these ends to the armature also serve to support the cylindrical pins 36 of such devices. In the final assembly (FIGS. 1 and 2), these pins project into and substantially through parallel holes 43 in the hub spaced around the coupling axis to receive the projecting pins 36 of the armature assembly (FIG. 7), the holes being slightly larger in diameter than the pins so as to provide continuous clearance 44 around the latter.

Friction stops in the form of radially expansible or contractable rings 41 of resilient material are interposed between external surfaces of the pins 36 and internal surfaces of the holes 43 and sized and stressed to grip one of such surfaces frictionally and resist axial shifting of the rings axially of the pins with a total force which is somewhat greater than the force exerted by the leaf springs 23 in biasing the armature away from the magnet face and toward the hub. This resisting force is very small as compared with the magnetic attractive force that draws the armature ring against the magnet face 16 when the coil 14 is energized to apply the brake.

The rings 41 may be composed of various resilient materials and take the form of a continuous circle or polygon of firm rubber or plastic or, preferably, as in the present instance, the ring may be split, composed of spring wire, and stressed to expand during insertion of a pin 36 therethrough and then contract (See FIGS. 1 and 9) with the desired gripping pressure around the exterior of the ring. As an alternative and as shown in FIG. 10, the ring may be stressed to expand and similarly grip the internal wall defining the hole 43. In each instance, the diameter of the resilient material of the rings is somewhat greater than the radial clearance 44 between the opposed pin and hole walls so that one peripheral edge portion of the rings projects radially in between opposed and axially facing walls 45 and 46 of a groove or slot formed in the hub around the pin holes (FIGS. 1 and 9) or in and around the pin (FIG. 10). These walls are axially spaced-apart a distance greater than diameter of the ring wire by an amount precisely equal to the width of the gap 26 which it is desired to maintain between the magnet and armature faces when the brake is released (FIG. 1).

In the form shown in FIGS. 1 to 6, the wall 45 constitutes an abutment for controlling the sliding of the split ring along its pin 36 as the armature, whose face 17 may have worn away in previous brake engagements, comes against the magnet face 16 when the brake is applied as shown in FIG. 2. Thus, this abutment coacts with the split friction ring during engagement of the brake to sense the wear which may have occurred in previous brake applications, the ring being shifted along its pin and away from the armature in exact accordance with the amount of such axial wear.

The other abutment wall 46 is disposed in the path of retraction of the split ring 41 in its newly adjusted position and engages the ring as shown in FIG. 1 to limit the extent of separation of the armature from the magnet under the action of the leaf springs 23. Preferably, the stop rings 41 are, when the armature is new and its face unworn, adjusted to positions along the pins 36 so as to be in engagement with the abutment 46 as shown in FIG. 1 when the gap 26 is of the desired width.

It is apparent from the foregoing that the frictionally held stop rings 41 coact with the abutments 45 and 46 respectively in the movements of the armature toward and away from the magnet face so as to sense existing wear at the magnet and armature faces 16 and 17 and limit the retraction of the armature by the leaf springs 23 to compensate for such wear and always maintain an idle gap 26 of precisely uniform and very narrow width. Thus, the mechanical time delay incident to full engagement of friction coupling will be reduced to a minimum due to the maintained narrowness of the gap 26, and the time for developing the full torque of the clutch or brake will be extremely uniform under all conditions of service use. This, together with the antibacklash mounting above described, greatly extends the usefulness of couplings of the present character.

Another important feature of the invention is the construction of the abutments 45 and 46 in order to facilitate ease of assembly and achieve optimum overall axial compactness of the supporting hub. To this end, outwardly opening and narrow slots 48 (FIGS. 1 to 3) disposed in planes normal to the coupling axis are cut in angularly spaced portions 50 of the outer end of the hub 20 to provide pairs of opposed parallel walls whose inner end portions define the properly spaced abutments for each of the stop rings 41. In the hub construction shown in FIGS. 1 to 6, the pin holes 43 extend through the hub portions 50 and areas 51 of the hub adjacent one side of these portions are cut away and depressed to receive the heads of the rivets 30 which heads are disposed below the plane of the slots 48. Thus the latter and the abutments may be formed in a simple sawing operation. Since the slots thus formed open outwardly or radially relative to the parts 50 of the hub, the split rings 41 may be inserted edgewise into the slots and easily centered relative to the pin holes 43.

In assembling the coupling, the leaf springs are riveted to the back of the armature and to the ends of the pins 36 to form the subassembly shown in FIG. 7. Then, after inserting the stop rings 41 edgewise into the slots 48 and locating the same in axial alignment with the pin holes 43, the subassembly is placed adjacent the hub with the beveled free ends 52 of the pins aligned with the holes, such ends guiding the entry of the pins through the stop rings as the hub and subassembly are pressed together. The holes 32 in the spring ends 29 are thus brought into alignment with the hub holes 34 permitting insertion of the rivets 30 and peening thereof to form the heads 35 and thus secure the spring ends to the hub. If desired, the proper prestressing of the leaf spring to provide the desired armature separating force may be effected after the final assembly as by holding the armature face against the magnet and separating the hub from the armature by a small amount to produce the proper prestress.

When the invention is incorporated in a coupling of larger size it may be desirable to form the abutments 45 and 46 as the opposite walls of a groove 53 formed as with a suitable single point boring tool. Such a modification is shown in FIG. 9, the exterior of the hub being left uninterrupted and cylindrical.

Instead of forming the abutments 45 and 46 in the hub, these may be formed on the pin 36 as in the modification shown in FIG. 10. For this arrangement, the friction necessary to hold the stop on the pin is achieved by construction of the ring to expand against the cylindrical interior of the hole wall instead of contracting around the pin as in the preferred form first described.

The leaf spring armature mounting and the automatic air gap maintaining devices may be used in magnetic friction clutches as well as in brakes as above described and are especially adaptable for use in clutch-brake combinations as illustrated in FIGS. 11 to 13 so as to achieve overall axial compactness by mounting of the armatures 55 and 56 of a clutch 57 and a brake 58 on a disk 59 in a novel manner to provide optimum overall axial compactness of the combined couplings. As before, the flat armature ring 56 of the brake is disposed adjacent the pole faces of a magnet ring 63 fixed to a suitable support 64 and adapted when its coil 63a is energized to draw the armature into axial gripping engagement with its friction face 63b and develop a friction torque which is transmitted through the armature and a leaf spring coupling as described above to a driven shaft 62 journaled in suitable bearings (not shown) which hold the hub axially fixed.

The clutch 57 shown is of the stationary field type having a U-shaped magnet ring 60 fixed to a support 60a and concentric pole pieces separated by a narrow radial gap 65 from the corresponding concentric pole pieces of a rotor 66 having an annulus 67 of wear-resistant material fixed between and flush with the pole faces 68 of the rotor. The inner pole piece of the rotor is pressed on a flange 69 on a hub 70 suitably fixed against a shoulder 71 on a driving shaft 72. The latter is journaled in suitable bearings 72a mounted in the support 64 and maintaining the rotor axially fixed and concentric with the clutch axis. The armatures 55 and 56 are disposed on opposite sides of the disk 59 which is integral with a central hub 73 suitably fixed onto the inner end of and against a shoulder 96 on the driven shaft 62.

As in the brake first described, the clutch armature 55 is supported through flat and secantially extending leaf springs 74 each having one end 85 secured to the armature 55 by a rivet 75 formed by the end of a pin 76 which projects loosely into one of three holes 77 equally spaced around the periphery of the disk 59. The armature 56 of the brake is similarly supported by axially flexible leaf springs 78 extending along secants of the armature and disposed between the hub disk and the flat back of the armature. One end of each of these springs is secured to the back of the armature 56 by a rivet 87 (FIG. 13) formed by one end portion of a pin 88 which projects loosely into one of three holes 89 equally spaced around the periphery of the disk 59.

The clutch and brake leaf springs 74 and 78 are arranged in alternating relation or staggered angularly around opposite sides of the disk 59 so that the ends 80 and 81 of one pair of the springs 74 and 78 align with each other as shown in FIG. 11 and with a hole 82 through the disk and receive a common rivet 84 by which the overlapping spring ends and the disk are secured together. By virtue of such staggering of the leaf springs of the sets supporting the clutch and brake armatures on opposite sides of the hub and securing one end of a spring of each set to opposite sides of the hub by a single rivet, the supporting disk 59 may be of minimum axial thickness and the construction of the mounting for the armatures correspondingly simplified.

As before, the pins 76 and 88 constitute parts of devices for sensing wearing off of the clutch and brake faces and limiting separation of the armatures from the associated magnets upon deenergization of the latter so as to establish idle gaps 90 and 91 (FIG. 11). As shown in FIG. 13, these devices include split rings of spring wire 92 for the brake pins 88 and 93 for the clutch pins 76. These rings are disposed in common slots 94 which, by a sawing operation, may be cut across the full arcuate width of radial arms 59a on the disk 59. The opposed walls of each slot thus constitute the necessary abutments for coacting, as in the brake first described, with two of the split rings 93 and 92 and the pins 76 and 88 of the clutch and brake wear adjusting devices to sense wear at the friction faces when each coupling is energized and then determine the extent of separation of the armature from the associated magnet face when the coupling magnet is deenergized to release the coupling.

The leaf springs 78 of the brake are prestressed in the manner above described so as to continuously bias the armature toward the disk 59. The leaf springs 74 supporting the clutch armature 55 are similarly prestressed so as to bias this armature away from the pole faces 68 of the rotor 66 when the coil 61 is deenergized.

It will be apparent from the foregoing that in the clutch-brake unit (FIGS. 11 to 13), the leaf springs 74 and 78 provide mountings free of backlash supporting the clutch and brake armatures for free axial floating while directly transmitting the clutch and brake torques thus permitting a constant clearance 98 to be maintained around each of the pins 76, 88. Thus, the latter are slidable freely in the holes 77 and 89 so that the wear-sensing and gap-determining devices formed by the pins 76 and 88, the split rings 93, 92, and the associated abutments formed by the walls of the slots 94 may act to establish the air gaps 90 and 91 of minimum thickness and precise uniformity.

With the leaf springs 74 and 78 arranged in the staggered relation on opposite sides of the supporting disk as shown in FIG. 12, a minimum number of the rivets 84 are required to secure the disk ends of the springs and the pins 76 and 88 may be disposed in a common plane as shown in FIG. 13. Optimum axial compactness is thus achieved in the disk and double leaf spring and armature assembly.

I claim:

1. A friction-type torque-producing coupling having, in combination, axially fixed and axially movable relatively rotatable first and second rings of magnetic material adapted to be drawn into axial gripping engagement by magnetic flux threading a toroidal path through the rings, an axially fixed support member disposed adjacent said second ring on the side thereof opposite the first ring and having a plurality of holes therein angularly spaced around and paralleling the coupling axis, pins rigid with said second ring and projecting slidably into the respective holes, stop members disposed intermediate the ends of said holes and frictionally gripping and slidable axially relative to a peripheral surface on one of said members, pairs of opposed abutments disposed on opposite sides of each of said stop members, one being engageable with the stop member upon axial engagement of said rings to shift the stop member along said axis by an amount equal to the wear that has occurred at said ring faces, the other abutments engaging the stop member to limit the extent of separation of the rings when the latter are deenergized whereby to establish an air gap of constant width each time the rings are deenergized, and means supporting said second ring from said support member and transmitting the coupling torque comprising a plurality of leaf springs between said support member and second ring angularly spaced around and extending along secants of the ring, and means securing opposite ends of said springs to said support member and said second ring respectively whereby such ring is supported for free axial floating and for transmitting torque between said rings, said springs being stressed to flex laterally and bias said second ring away from the first ring with a force which is less than the frictional resistance holding the axial positions of said stop members.

2. A torque-producing device as defined in claim 1 in which said pins are located at the ends of said springs which are secured to said second ring.

3. A torque-producing device as defined in claim 1 in which one end of each of said pins is formed with a projecting shank terminating at a shoulder, said shank constituting a rivet having a head clamping the ring and spring end against the shoulder.

3. A torque-producing coupling as defined in claim 1 in which opposite ends of said leaf springs lie against and are riveted rigidly to said support member and second ring respectively.

5. A torque-producing coupling as defined in claim 1 in which the ends of said pins constitute rivets securing the ends of said springs to said second ring.

6. A torque-producing device as defined in claim 1 in which each of said stop members comprises a radially yieldable stop ring of resilient material having one peripheral edge disposed between and axially engageable with said abutments and an opposite peripheral edge which, by virtue of the radial resiliency of the ring, grips an opposed peripheral surface to provide a predetermined friction gripping force resisting displacement of the stop ring relative to and along the axis of said second magnetic ring.

7. A torque-producing coupling as defined in claim 1 in which the torque resulting from gripping engagement of said magnetic rings, when the latter are energized, is transmitted solely through endwise stressing of said leaf springs and said second ring is supported at all times for free sliding of said pins within the surrounding walls of said holes.

8. A torque-producing coupling as defined in claim 1 in which each of said stop members is a ring of resilient material and said abutments are the opposed walls of an annular groove surrounding the pins and wider than the stop ring by the desired width of said constant gap when the coupling is released.

9. A torque-producing device as defined in claim 8 in which said groove is formed in said support as a slot opening outwardly in a plane normal to the coupling axis so as to permit of edgewise insertion of the ring into the slot and to a position of alignment with the axis of the pin hole.

10. A torque-producing coupling as defined in claim 9 in which the free ends of said pins are frustoconical to facilitate projection of the pins through said stop rings after edgewise insertion of such rings in said slots.

11. A torque-producing coupling as defined in claim 1 in which each of said stop members is a ring of resilient material expanded radially against the wall of the surrounding hole and the associated abutments are the opposed axially facing walls of an annular groove in the associated pin.

12. In a friction coupling having relatively rotatable first and second rings of magnetic material adapted to be drawn into axial gripping engagement by magnetic flux threading a toroidal path through the rings, the combination of, a rotatable support, a plurality of leaf springs angularly spaced around and extending along secants of said first ring between said support and said ring, means securing opposite first and second ends of said springs to said support and the back of the ring respectively, said springs being stressed to flex laterally and to bias said first ring toward said support and away from said second ring upon deenergization of the rings, a plurality of angularly spaced pins rigid with said first ring adjacent said first spring ends and projecting parallel to the first spring axis, parallel holes in said support slidably receiving said pins, radially resilient stop rings encircling and slidable along said pins within said holes but frictionally gripping the pins to resist sliding along the pins with a force greater than said biasing force, and opposed axially facing abutments within each of said holes disposed on opposite sides of the ring therein and spaced apart to cooperate with the respective stop rings and limit axial separation of said first ring from the coacting magnetic ring so as to provide a gap of predetermined narrow width between the faces of said magnetic rings upon deenergization of the latter.

13. In a magnetic friction clutch and brake of the character above described, a rotary hub, annular clutch armature concentric with the hub axis and disposed at one end of said hub, a set of leaf springs angularly spaced around and extending along secants of said armature between the latter and said hub, an annular brake armature disposed opposite the other end of said hub, a second set of leaf springs angularly spaced around and extending along secants of the brake armature between the latter and said hub, the first and second leaf springs being staggered relative to each other around said armatures and hub with one end of each spring of one set overlapping an end of the corresponding spring of the second set, rivets each extending through said hub and one pair of said overlapping spring ends and securing the latter to the hub, second rivets securing the other ends of said first springs to the back of the clutch armature, first parallel pins rigid with and constituting extensions of said second rivets and projecting rigidly from such armature and into parallel holes in said hub, third rivets securing the other ends of said second springs to the back of said brake armature, second parallel pins rigid with and constituting extensions of said third rivets and projecting rigidly from such armature and into parallel holes in said hub, one of said first pins and one of said second pins being angularly spaced apart with one of said first rivets disposed between such pins.

14. A magnetic armature ring mounting as defined in claim 13 in which the pins of the brake and clutch armatures project past each other and the holes receiving such pins are disposed approximately in a common plane of said hub.

* * * * *